United States Patent [19]
Okazaki et al.

[11] Patent Number: 5,779,231
[45] Date of Patent: Jul. 14, 1998

[54] VIBRATION-ISOLATING MOUNT DEVICE

[75] Inventors: Koji Okazaki; Yasuji Nozawa; Masaki Ueyama; Masakazu Kinoshita; Hidetaka Ozawa, all of Saitama-ken, Japan

[73] Assignee: Honda Giken Kogyo Kabushiki Kaisha, Tokyo, Japan

[21] Appl. No.: 960,086

[22] Filed: Oct. 24, 1997

Related U.S. Application Data

[63] Continuation of Ser. No. 861,467, May 21, 1997, abandoned, which is a continuation of Ser. No. 622,922, Mar. 27, 1996, abandoned, which is a continuation of Ser. No. 232,905, Apr. 27, 1994, abandoned.

[30] Foreign Application Priority Data

| Apr. 28, 1993 | [JP] | Japan | 5-102448 |
| Apr. 11, 1994 | [JP] | Japan | 6-072272 |

[51] Int. Cl.⁶ ............................ F16F 5/00; F16M 5/00
[52] U.S. Cl. .................................. 267/140.14; 267/219
[58] Field of Search ........................ 267/140.11, 140.12, 267/140.13, 140.14, 140.15, 136, 219; 188/299; 243/562, 636; 180/300, 312

[56] References Cited

U.S. PATENT DOCUMENTS

| 4,709,779 | 12/1987 | Takehara | 267/140.14 X |
| 4,784,378 | 11/1988 | Ford | 267/140.11 X |
| 4,840,358 | 6/1989 | Hoying et al. | 267/140.14 |
| 5,238,232 | 8/1993 | Kobayashi et al. | 267/140.14 |
| 5,249,782 | 10/1993 | Ide et al. | 267/140 |
| 5,310,169 | 5/1994 | Kojima | 267/140.14 |
| 5,366,211 | 11/1994 | Hamada et al. | 267/140.14 |
| 5,370,375 | 12/1994 | Kojima | 267/140.14 |

FOREIGN PATENT DOCUMENTS

| 0413083 | 2/1990 | European Pat. Off. |
| 0395795 | 11/1990 | European Pat. Off. |
| 053676 | 4/1993 | European Pat. Off. |
| 2653717 | 5/1991 | France |

OTHER PUBLICATIONS

Schwingungs–isolation and kompensation durch piezokeramisch aktivierte Motorlagerungen Article—(Von Hans) (ATZ 1993).

*Primary Examiner*—Lee W. Young
*Attorney, Agent, or Firm*—Lyon & Lyon LLP

[57] ABSTRACT

A mounting member fixed to an engine and a mounting member fixed to a vehicle body are interconnected by a hollow elastomeric block which has a variable-volume primary fluid chamber defined therein. A subsidiary fluid chamber having a diaphragm on a portion of an outer wall thereof communicates with the primary fluid chamber through two fluid passages. A movable plate forming a portion of the outer wall of the primary fluid chamber is connected to a voice coil motor, and by one example, is driven at the same phase as a vibration applied from the engine. During a normal traveling, both the fluid chambers communicate with each other through the fluid passage having a smaller length. During idling or during a low speed traveling, a switch-over valve is operated to permit both the fluid chamber to be put into communication with each other through the fluid passage having a larger length. With the above construction, it is possible to stably exhibit the performance of the vibration-isolating mount device in a wide frequency region.

11 Claims, 20 Drawing Sheets

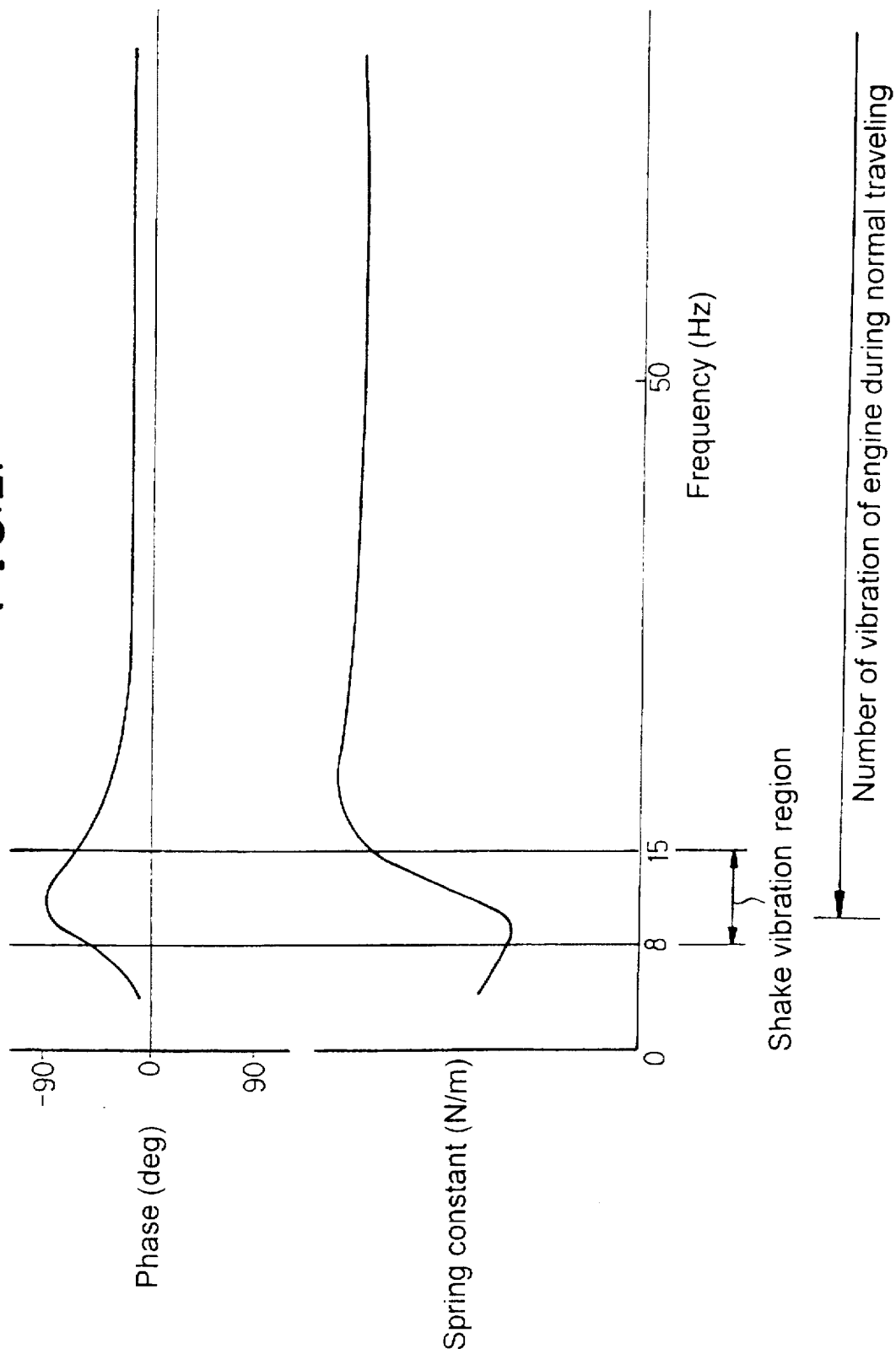

VIBRATION-ISOLATING MOUNT DEVICE

This application is a Continuation Application, of application Ser. No. 08/861,469 filed May 21, 1997, now abandoned, which is a Continuation of 08/622,922, filed Mar. 27, 1996, now abandoned, which is a Continuation Application of 08/232,905, filed Apr. 27, 1994, now abandoned.

BACKGROUND OF THE INVENTION

1. Field of the Invention

The present invention relates to a vibration-isolating mount device for use, for example, in an engine mount for a vehicle, and particularly, to a vibration-isolating mount device including an intermediate member for interconnecting a mounting member fixed to a vibrating member and a mounting member fixed to a pedestal, the intermediate member having an outer shell formed, at least in part, of an elastomer, the intermediate member having a fluid chamber with a fluid sealedly charged therein, and a movable plate connected to an actuator and forming a portion of the fluid chamber.

2. Description of the Prior Art

Such vibration-isolating mount device is conventionally known from Japanese Utility Model Publication No. 39481/92. With the above device, a vibration transmitted to a vehicle body through a fluid pressure generated in a primary fluid chamber can be attenuated by applying, to the movable plate provided in the primary fluid chamber, a vibration of a predetermined phase against a vibration received from an engine.

FIG. 21 illustrates characteristics of the above prior art vibration-isolating mount device, wherein a fluid column resonance characteristic of a fluid passage interconnecting the primary fluid chamber and a subsidiary fluid chamber is set such that a large difference in phase between the input and the displacement is produced in a particular frequency region of 8 Hz to 15 Hz, thereby enhancing the damping performance to improve the riding comfort performance against shaking or the like.

However, if the liquid column resonance characteristic is set in the above manner, there is a problem that the phase characteristic and the spring constant of the vibration-isolating mount device are suddenly varied in the particular region, resulting in an unstable vibration control by the movable plate provided in the primary fluid chamber, and in a reduced performance of the vibrationisolating mount device during idling or during a low speed traveling.

There is also another problem that when the movable plate fails is stuck, or the actuator for the movable plate during low speed traveling, an effect of damping the vibration of the engine is reduced, resulting in a degraded riding comfort.

SUMMARY OF THE INVENTION

Accordingly, it is an object of the present invention to provide a vibration-isolating mount device wherein a vibration control by a movable plate can be effectively performed in a wide frequency region and moreover a reduction in riding comfort performance can be prevented when a failure is produced.

To achieve the above object, according to the present invention, there is provided a vibration-isolating mount device comprising an intermediate member for interconnecting a mounting member fixed to a vibrating member and a mounting member fixed to a pedestal, the intermediate member having an outer shell formed, at least in part, of an elastomer, the intermediate member having a fluid chamber with a fluid sealedly charged therein, and a movable plate connected to an actuator and forming a portion of the fluid chamber, wherein the vibration-isolating mount device further includes a damping characteristic varying means for varying the damping characteristic of the intermediate member.

With the above construction, the damping characteristic of the intermediate member, which has the fluid chamber with the fluid sealedly charged therein, and the outer shell formed, at least in part, of the elastomer, is varied. Therefore, the difference in phase between the input and the displacement and the spring constant can be varied to any level in accordance with the operational condition, thereby reconciling the inhibition of a shake phenomenon and the damping effect provided by the movable plate to provide an enhanced riding comfort performance.

The vibrating member may be an engine, and the pedestal may be a vehicle frame. In this case, if the damping characteristic varying means shifts the damping characteristic of the intermediate member toward a low frequency side, when the number of revolutions of the engine is equal to or less than a predetermined value, or when the vehicle is in an operational condition in which no shake phenomenon is produced, an increase in difference in phase between the input and the displacement can be prevented to effectively exhibit a damping effect.

If the damping characteristic varying means shifts the damping characteristic toward a high frequency side when an abnormality is produced in the operational condition, an intensification in vibration noise produced in the vehicle can be prevented.

The above and other objects, features and advantages of the invention will become apparent from the following description of preferred embodiments, taken in conjunction with the accompanying drawings.

BRIEF DESCRIPTION OF THE DRAWINGS

FIGS. 1 to 6 illustrate a first embodiment of the present invention, wherein

FIG. 1 is a vertical sectional view of a vibration-isolating mount device;

FIG. 2 is a sectional view taken along a line 2—2 in FIG. 1;

FIG. 3 is a sectional view taken along a line 3—3 in FIG. 2;

FIG. 4 is a view, similar to FIG.3, for explaining the operation;

FIG. 5 is a block diagram of a control system; and

FIG. 6 is a graph illustrating characteristics of the vibration-isolating mount device;

FIG. 21 is a graph illustrating characteristics of a prior art vibration-isolating mount device.

DESCRIPTION OF THE PREFERRED EMBODIMENTS

A first embodiment of the present invention will now be described in connection with FIGS. 1 to 6.

Figure 1:
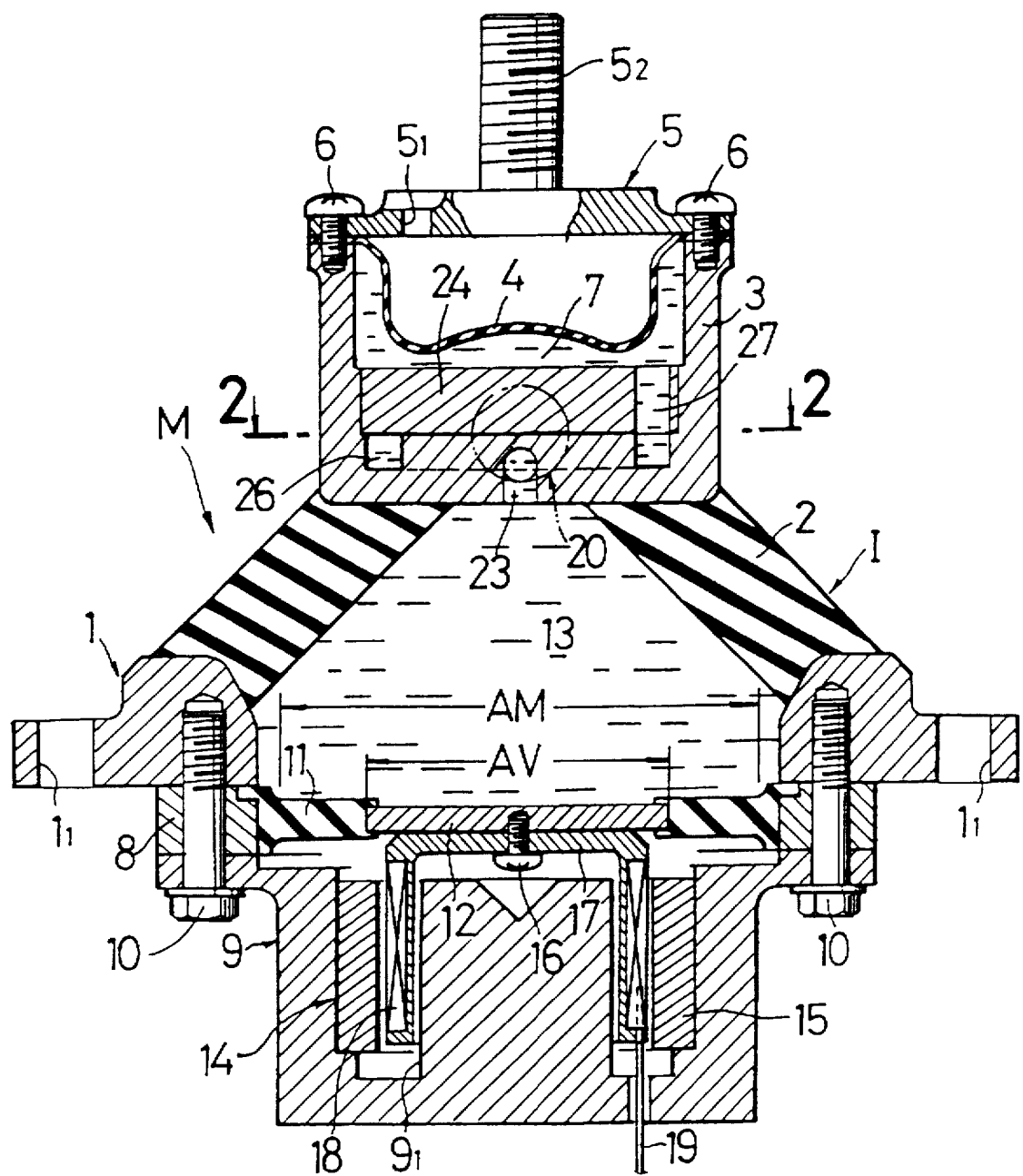

Referring to FIG. 1, a vibration-isolating (or, vibration-proofing) mount device M is provided for supporting an engine of a vehicle on a vehicle body frame, and includes an annular mounting member 1. An elastomeric block 2 made of rubber formed into a truncated conical shape is fixed to an upper surface of the mounting member 1 by baking. Further, a cup-like subsidiary fluid chamber housing 3 is fixed to an upper surface of the elastomeric block 2 by baking. A diaphragm 4 made of rubber and a plate-like mounting member 5 are co-fastened to an opening in an upper surface of the subsidiary fluid chamber housing 3 by a plurality of bolts 6 - - - . A subsidiary variable-volume fluid chamber 7 is defined between the diaphragm 4 and the subsidiary fluid chamber housing 3. A space above the diaphragm 4 communicates with the atmosphere via a through-hole $5_1$ opened in the mounting member 5.

An annular movable plate supporting member 8 and a motor housing 9 are co-fastened to a lower surface of the mounting member 1 by a plurality of bolt 10 - - - . A movable rubber leaf spring 11 formed of an annular rubber membrane is fixed to an inner periphery of the movable plate supporting member 8 by baking. And a disk-like movable plate 12 is fixed to an inner periphery of the movable rubber leaf spring 11 by baking. A primary variable-volume fluid chamber 13 is defined by the elastomeric block 2, the subsidiary fluid chamber housing 3, the movable rubber leaf spring 11 and the movable plate 12.

The mounting member 1, the elastomeric block 2, the subsidiary fluid chamber housing 3, the diaphragm 4 and the movable plate rubber leaf spring 11 constitutes an intermediate member I.

If the axially projected area of the elastomeric block 2 at a side of the primary fluid chamber 13 is represented by substantially AM, and the area of the movable plate 12 is represented by AV, a value of AM/AV is set in a range of 1.5 to 3.0. If the static spring constant of the elastomeric block 2 is represented by KS, and the static spring constant of the movable rubber leaf spring is by KV, a value of KS/KV is set at about 10.

A voice coil motor 14 is accommodated in the motor housing 9. The voice coil motor 14 includes a permanent magnet 15 fixedly mounted around an outer periphery of an annular groove $9_1$ recessedly provided in the motor housing 9 constituting a magnetic circuit, and a coil 18 which is wound around a cup-like coil bobbin 17 which is fixed to a lower surface of the movable plate 12 by a bolt 16, and which is in an opposed relation to an inner periphery of the permanent magnet 15. The coil 18 is connected through a lead wire 19 to a control unit which is not shown. If an electric current of a predetermined frequency is applied to the coil 18 through the lead wire 19, the movable plate 12 is vibrated vertically along with the movable rubber leaf spring 11 by an electromagnetic force applied between the permanent magnet 15 and the coil 18.

Figure 2:
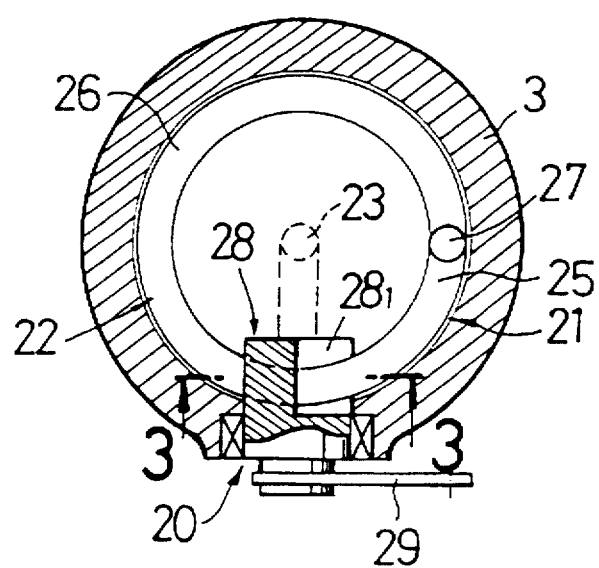
Figure 3:
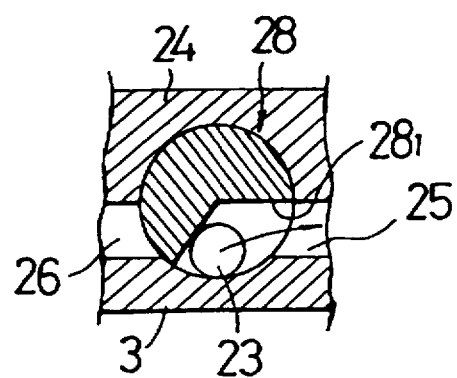
Figure 4:
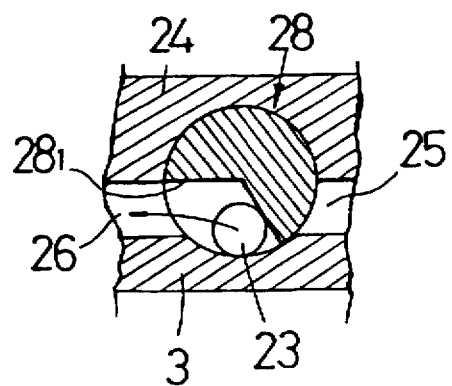

As can be seen from FIGS. 2 and 3, the primary and subsidiary fluid chambers 13 and 7 communicate with each other through either one of a first fluid passage 21 and a second fluid passage 22 which can be switched by a switch-over valve 20 The first fluid passage 21 includes a first L-shaped through-hole 23 extending upwardly from a central portion of a bottom of the subsidiary fluid chamber housing 3 and bent radially, a second arcuate through-hole 25 having a center angle of 90° formed between the subsidiary fluid chamber housing 3 and a passage-defining member 24, and a fourth through-hole 27 extending upwardly through the passage-defining member 24. The second fluid passage 22 includes the first through-hole 23, a third arcuate through-hole 26 having a center angle of 270° formed between the subsidiary fluid chamber housing 3 and the passage-defining member 24, and the fourth through-hole 27. Because there is a difference between the length of the second through-hole 25 and the length of the third through-hole 26, the length of the first fluid passage 21 is set shorter than that of the second fluid passage 22.

The switch-over valve 20 is mounted at a portion where the first through-hole 23 is communicated with the second through-hole 25 and the third through-hole 26. The switch-over valve 20 includes a columnar valve member 28 rotatably carried in the subsidiary fluid chamber housing 3. The valve member 28 has a fan-like notch $28_1$. Thus, when the valve member 28 is in a rotational position shown in FIG. 3, the first through-hole 23 is in communication with the second through-hole 25 through the notch $28_1$, and when the valve member 28 is in a rotational position shown in FIG. 4, the first through-hole 23 is in communication with the third through-hole 26 through the notch $28_1$.

Figure 5:
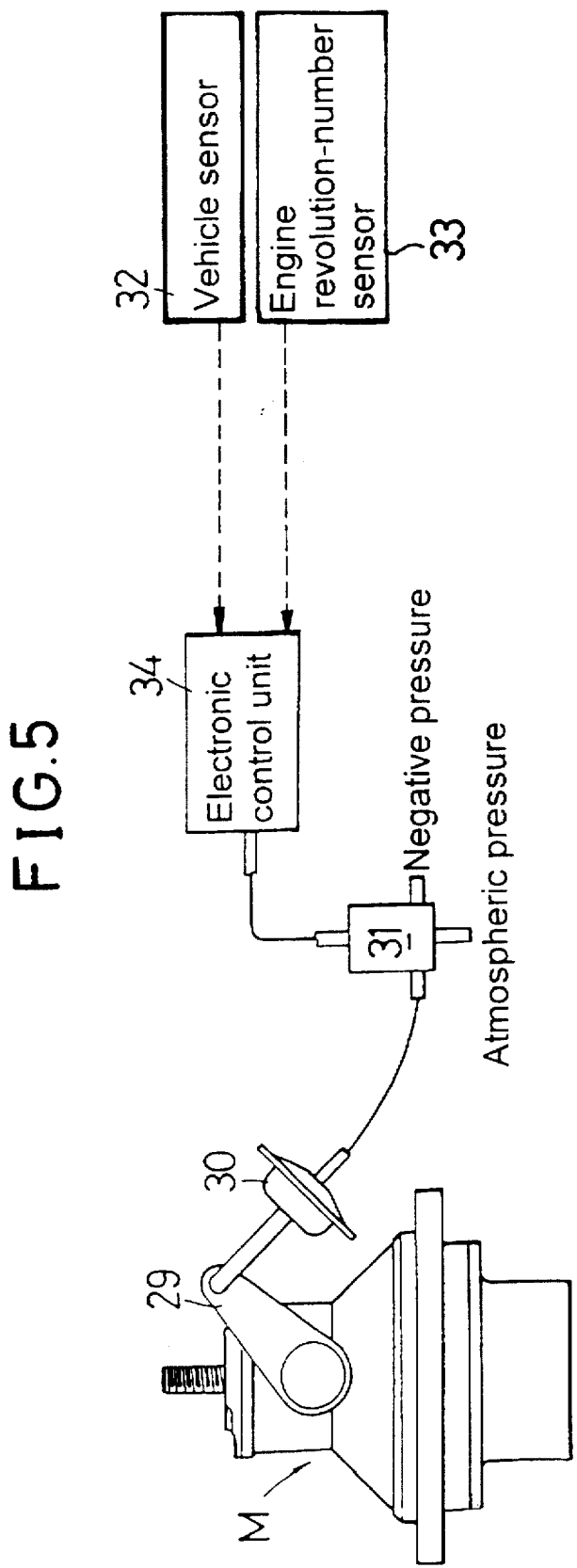

As can be seen from FIG. 5, a diaphragm-type actuator 30 is connected to an arm 29 provided on the valve member 28 of the switch-over valve 20. A solenoid valve 31 for driving the actuator 30 is connected to an electronic control unit 34 to which signals from a vehicle speed sensor 32 and an engine revolution-number sensor 33 are inputted. The solenoid valve 31 permits the actuator 30 to be selectively put into communication with either one of an intake manifold of the engine and the atmosphere.

Thus, during a normal traveling of the vehicle excluding an idling and a low speed traveling, i.e., when an engine revolution-number detected by the engine revolution-number sensor 33 exceeds 1,200 rpm, or a vehicle speed detected by the vehicle speed sensor 32 exceeds 40 km/hr, the switch-over valve 20 is in the position shown in FIG. 3, so that the primary and subsidiary fluid chambers 13 and 7 are in communication with each other via the first fluid passage 21 having the short length. On the other hand, during idling or during a low speed traveling, i.e., when the engine revolution-number detected by the engine revolution-number sensor 33 is equal to or less than 1,200 rpm, or the vehicle speed detected by the vehicle speed sensor 32 is equal to or less than 40 km/hr, the actuator 30 is operated by the solenoid valve 31 to shift the switch-over valve 20 to the position shown in FIG. 4, so that the primary and subsidiary fluid chambers 13 and 7 are in communication with each other via the second fluid passage 22 having the long length.

The vibration-isolating mount device M having the above-described construction is fixed to the vehicle body frame as a pedestal by bolts passed through a plurality of bolt bores $1_1$ - - - formed in the mounting member 1, and is fixed to an engine as a vibration body by a bolt $5_2$ integrally provided on the mounting member 5.

The operation of the embodiment of the present invention having the above-described construction will be described below.

When a vibration of the engine is applied to the mounting member 5, the elastomeric block 2 is deformed to increase or decrease the volume of the primary fluid chamber 13. More specifically, when the mounting member 5 is lowered to decrease the volume of the primary fluid chamber 13, a fluid flows from the primary fluid chamber 13 through the first fluid passage 21 or the second fluid passage 22 into the subsidiary fluid chamber 7. When the mounting member 5 is lifted to increase the volume of the primary fluid chamber 13, a fluid flows from the subsidiary fluid chamber 7 through the first fluid passage 21 or the second fluid passage 22 into the primary fluid chamber 13. In this case, before a fluid column resonance is generated, the fluid is only passed through the first fluid passage 21 or the second fluid passage 22, but when the fluid column resonance is generated, the vibration is damped by a resonance phenomenon of the fluid passed through the first fluid passage 21 or the second fluid passage 22.

Concurrently with this, an electric current of a predetermined frequency is applied to the voice coil motor 14 on the basis of an output from a vibration sensor which is not shown, and by one example, a vertical vibration is applied to the movable plate 12, such that this vibration is of the same phase as a vibration of the engine. That is, when the vibration of the engine acts to lower the mounting member 5, the movable plate 12 is moved downward to inhibit an increase in fluid pressure in the primary fluid chamber 13. When the vibration of the engine acts to lift the mounting member 5, the movable plate 12 is moved upward to inhibit a decrease in fluid pressure in the primary fluid chamber 13. This weakens the vibration transmitted from the engine to the vehicle body.

In this embodiment, the value of AM/AV which is a ratio of the equivalent area AM of a piston to the area AV of the movable plate is set in a range of 1.5 to 3.0. However, if the value becomes larger than such range, the equivalent mass of a movable portion is increased, so that the controllable frequency region is shifted toward a lower frequency side and narrowed, resulting in a difficulty to provide a sufficient damping effect in a control region required in an actual vehicle. Conversely, if the value of AM/AV becomes smaller than the above-described range, the thrust force of the voice coil motor 14 required for canceling the vibration of the engine from the fluid pressure is increased, which is disadvantageous in respects of cost and weight.

Further, in this embodiment, the value of KS/KV which is a ratio of the static spring constant KS of the elastomeric block 2 to the static spring constant KV of the movable rubber leaf spring 11 is set at about 10. However, if the value of KS/KV exceeds 10, the damping performance is not exhibited sufficiently by the movable plate 12. Reversely, if the value of KS/KV becomes smaller than 10, the required thrust force of the voice coil motor 14 is increased.

Next, variations in characteristics of the vibration-isolating mount device M by the switch-over valve 20 will be described below in connection with FIG. 6.

Figure 6:
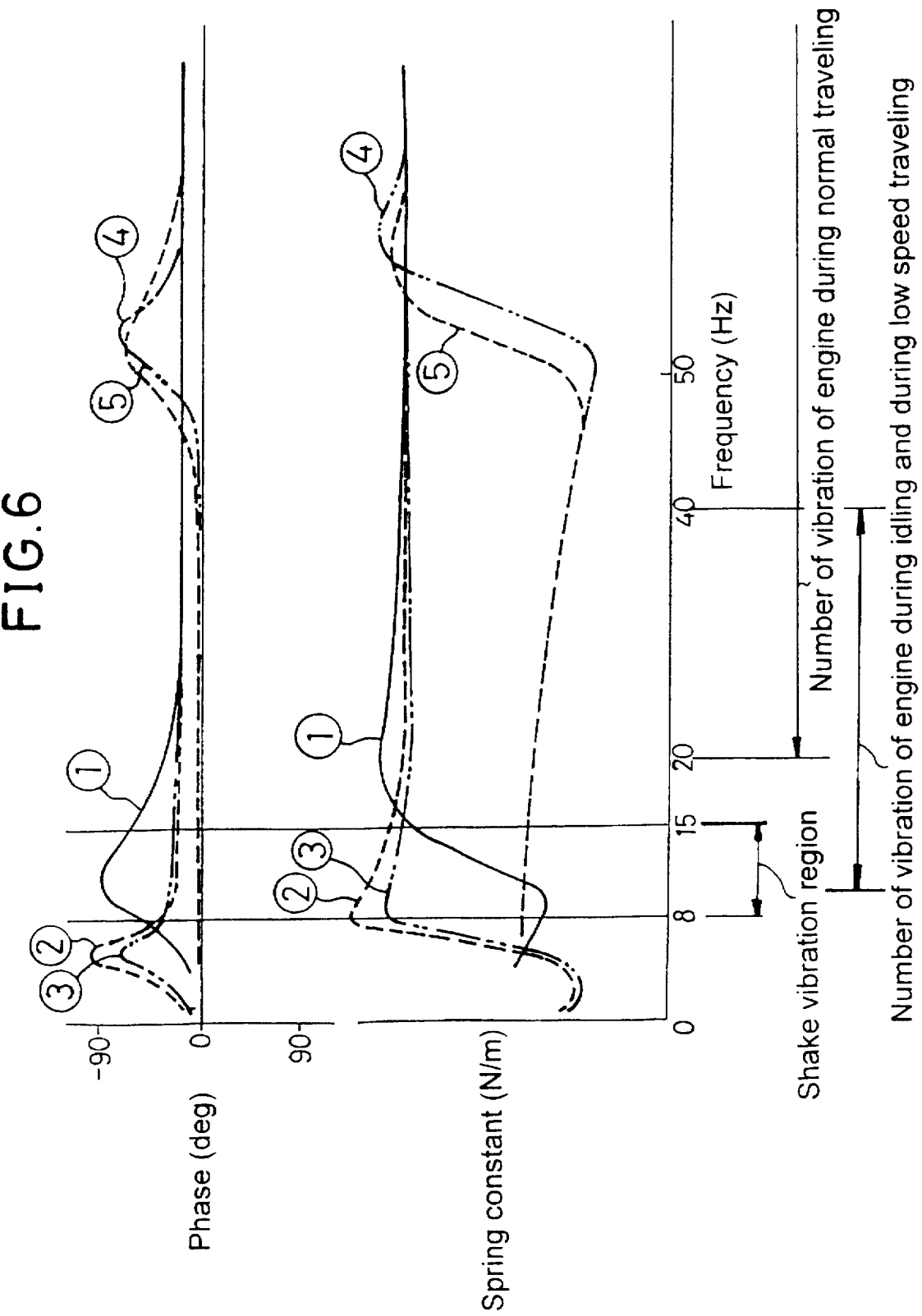

In FIG. 6, a curve shown by ① indicates a characteristic provided by the first fluid passage 21 having the short length, and a curve shown by ② indicates a characteristic provided by the second fluid passage 22 having the long length. The switch-over valve 20 is controlled in accordance with the vehicle speed and the number of revolutions of engine to provide the characteristics shown by ① and ②.

This will be described in detail. In a region in which the number of revolutions of engine exceeds 1,200 rpm, or the vehicle speed exceeds 40 km/hr, so that an input frequency is equal to or more than approximately 20 Hz (i.e., during a normal traveling), the characteristic ① provided by the first fluid passage 21 having the short length is selected. On the other hand, in a region in which the number of revolutions of engine is equal to or less than 1,200 rpm, or the vehicle speed is equal to or less than 40 km/hr, so that an input frequency is in a range of approximately 10 Hz to 40 Hz (i.e., during idling or during a low speed traveling), the characteristic ② provided by the second fluid passage 21 having the long length is selected.

As apparent from FIG. 6, in the characteristic ① selected during the normal traveling, the difference in phase between the input and the displacement is sharply increased in a shake vibration region of 8 Hz to 15 Hz to produce a large damping force and therefore, it is possible to effectively inhibit a shake phenomenon generated during the normal traveling by such damping force.

Referring to FIG. 6, assuming that the characteristic ① has been maintained without control of the shifting of the switch-over valve 20 in all the frequency regions, the spring constant of the vibration-isolating mount device M is suddenly varied during idling or low speed traveling in which an input frequency overlaps the shake vibration region. As a result, the damping control by the movable plate 12 is unstable. However, by shift-control of the switch-over valve 20 in a low frequency region during idling or during low speed traveling to provide the characteristic ②, the region in which the difference in phase between the input and the displacement is suddenly varied, can be shifted toward a lower frequency side than the shake vibration region, and the spring constant can be maintained flat over a wide range. This makes it possible to effectively exhibit a damping effect by the movable plate 12 over a wide frequency region.

Figure 7:
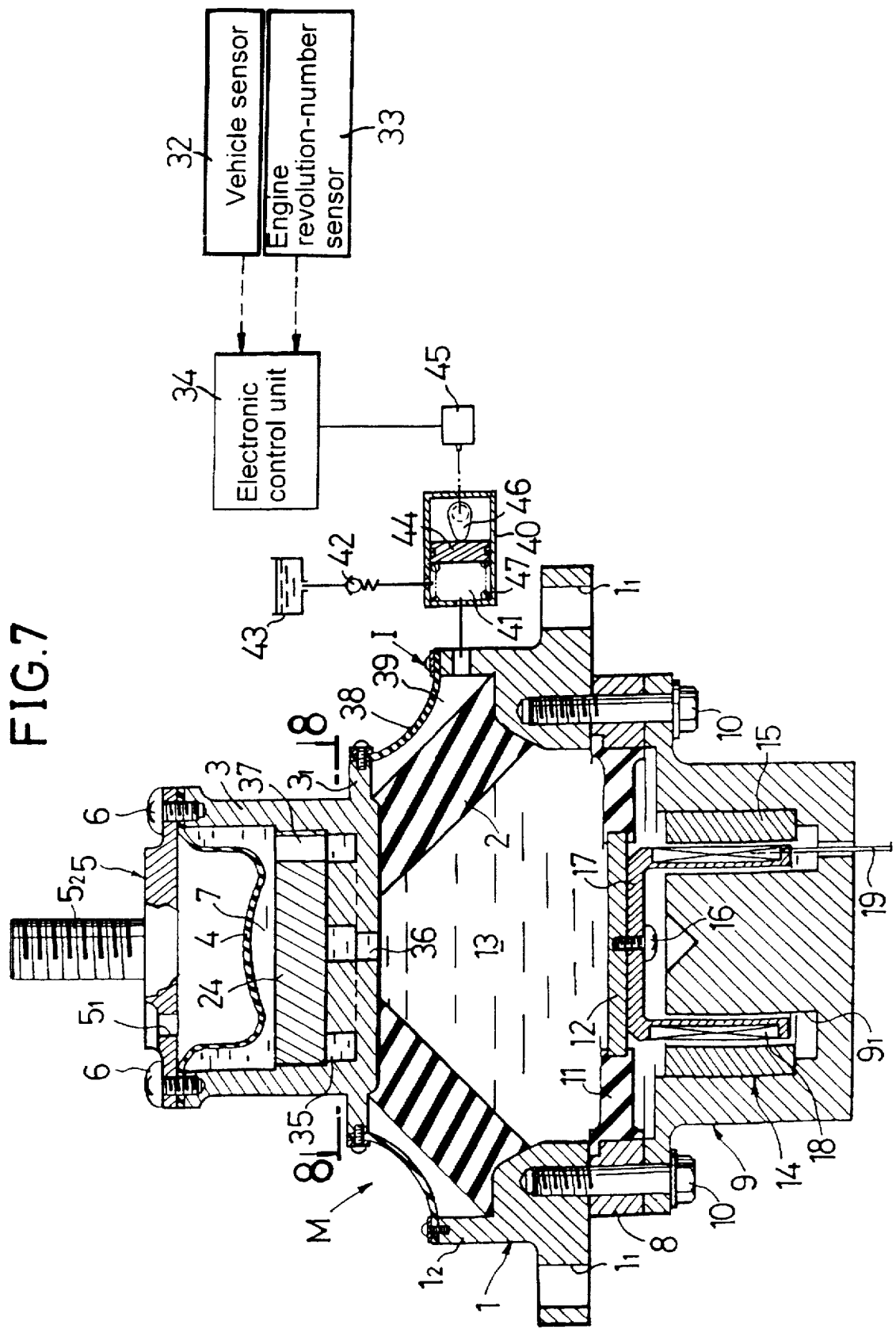
FIGS. 7 and 8 illustrate a second embodiment of the present invention, FIG. 7 being a sectional view similar to FIG. 1 of the first embodiment, and FIG. 8 being a sectional view taken along a line 8—8 in FIG. 7.
Figure 8:
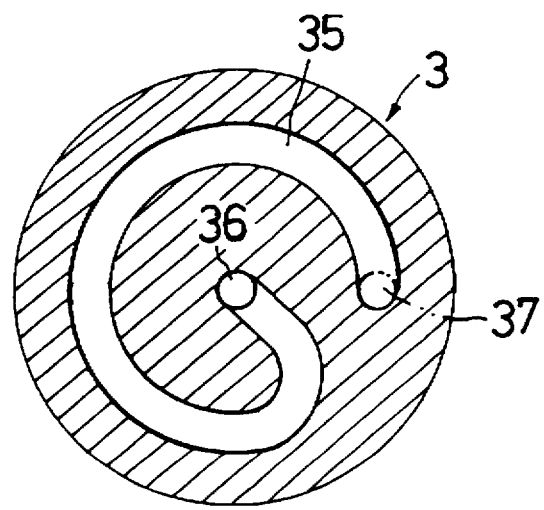

A second embodiment of the present invention will be described in connection with FIGS. 7 and 8, wherein like reference characters denote potions or components corresponding to those in the first embodiment.

A vibration-isolating mount device M in the second embodiment includes a substantially 6-shaped fluid passage 35 which is defined between a subsidiary fluid chamber housing 3 and a passage defining member 24. The fluid passage 35 has a fixed length and communicates at its one, end with a primary fluid chamber 13 through a first through-hole 36 and at the other end with a subsidiary fluid chamber 7 through a second through-hole 37. A diaphragm 38 is fixed between a flange $1_2$ projecting upwardly from an upper end of a mounting member 1 and a flange $3_1$ projecting radially outwardly from a lower end of the subsidiary fluid chamber housing 3, so as to cover an outer surface of an elastomeric block 2.

A control fluid chamber 39 is defined between the elastomeric block 2 and the diaphragm 38 and connected to a pressurizing chamber 41 defined within a cylinder 40. The pressurizing chamber 41 is connected to a reservoir 43 through a one-way valve 42. A piston 44 is slidably received in the cylinder 40 for varying the volume of the pressurizing chamber 41. The piston 44 is urged to a cam 46 rotated by a step motor 45 and is driven for advancement against a force of a return spring 47 which is compressed within the pressurizing chamber 41.

The step motor 45 is connected to and controlled by an electronic control unit 34 which receives signals from a vehicle speed sensor 32 and an engine revolution-number sensor 33. When the driving force of the step motor 45 causes the cam 46 to advance the piston 44, a fluid pressure generated in the pressurizing chamber 41 is transmitted to the control fluid chamber 39.

Thus, during a normal traveling at a number of revolutions of engine more than 1,200 rpm or at a vehicle speed more than 40 km/hr, the piston 44 is advanced to increase the fluid pressure transmitted from the pressurizing chamber 41 to the control fluid chamber 39, thereby ensuring that the elastomeric block 2 opposed to the control fluid chamber 39 is difficult to deform, providing the characteristic ① shown in FIG. 6.

On the other hand, during idling or during a low speed traveling at a number of revolutions of engine equal to or less than 1,200 rpm and at a vehicle speed equal to or less than 40 km/hr, the piston 44 is retreated to decrease the fluid pressure transmitted from the pressurizing chamber 41 to the control fluid chamber 39, thereby ensuring that the elastomeric block 2 opposed to the control fluid chamber 39 is easy to deform, so that the characteristic of spring constant and the characteristic of difference in phase between the input and the displacement are shifted toward a lower frequency side than the characteristic ①, thereby providing a characteristic ③. This permits the region in which the spring constant is suddenly varied to be shifted to a lower frequency side than the shake vibration region, thereby making it possible to exhibit a damping effect by the movable plate 12 even in the shake vibration region.

Figure 9:
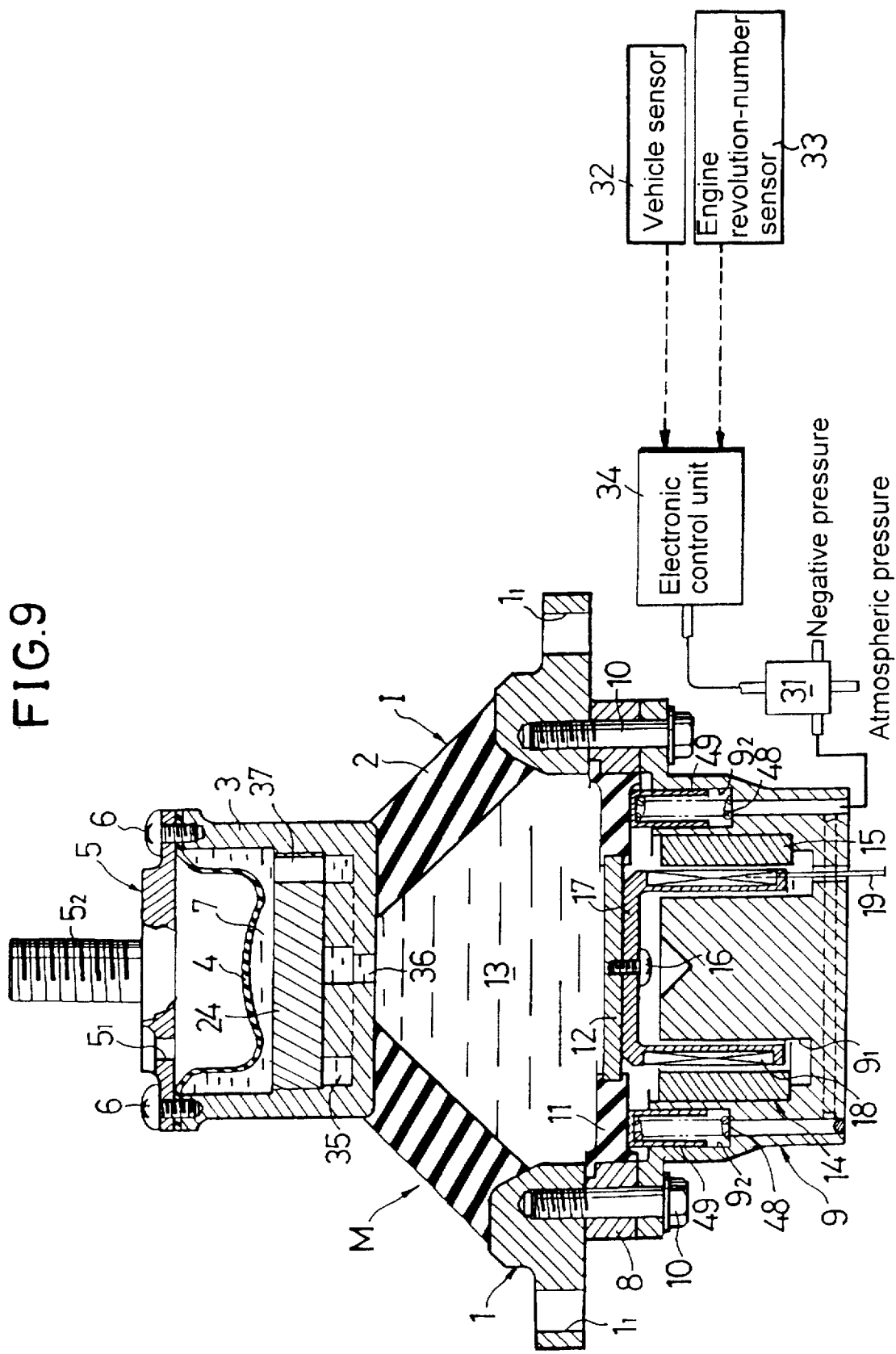
FIG. 9 is a sectional view similar to FIG. 1 of the first embodiment, but illustrating a third embodiment of the present invention.

A third embodiment of the present invention will now be described in connection with FIG. 9.

In a vibration-isolating mount device M in the third embodiment, pistons 49 - - - biased upwardly by springs 48 - - - are slidably received in a plurality of cylinders 9₂ - - - provided in an upper surface of a motor housing 9. Upper ends of the pistons 49 - - - abut against a movable plate rubber leaf spring 11. The cylinders 9₂ - - - are selectively put into communication with an intake manifold or the atmosphere through a solenoid valve 31 which is controlled by an electronic control unit 34.

Thus, during normal traveling, the insides of the cylinders 9₂ - - - are opened to the atmosphere through the solenoid valve 31, and the pistons 49 - - - are urged strongly against a lower surface of the movable plate rubber leaf spring 11 by resilient forces of the springs 48 - - -, thereby increasing the rigidity of the movable plate rubber leaf spring 11 to provide the characteristic ① shown in FIG. 6. On the other hand, during idling or during a low speed traveling, the insides of the cylinders 9₂ - - - are put into communication with the intake manifold, and the pistons 49 - - - are moved away from the lower surface of the movable plate rubber leaf spring 11 by a negative pressure therein against the resilient forces of the springs 48 - - -, thereby decreasing the rigidity of the movable plate rubber leaf spring 11 to provide the characteristic ③ shown in FIG. 6.

Figure 10:
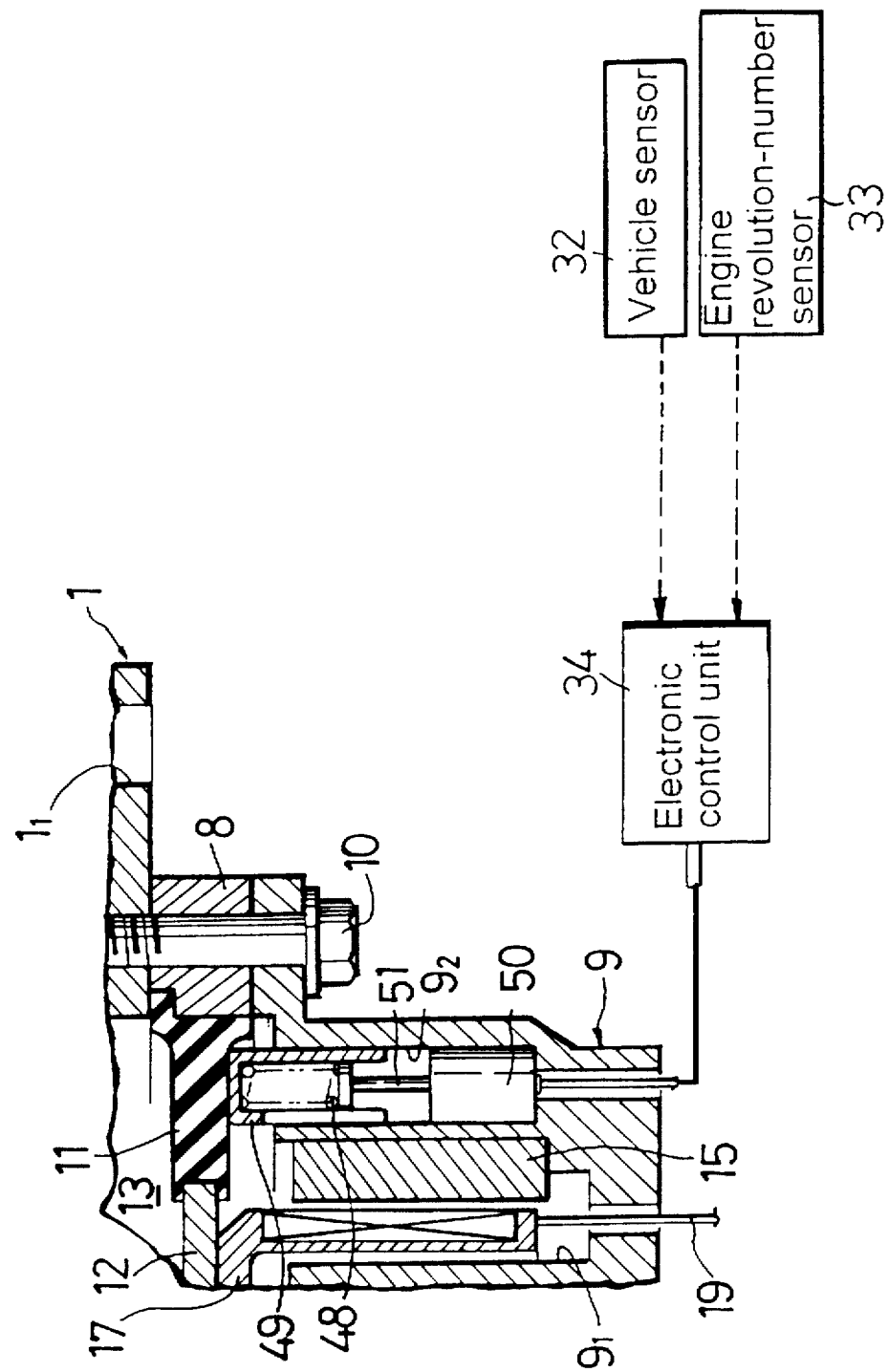
FIG. 10 illustrates a modification to the third embodiment.

A modification to the third embodiment will be described below in connection with FIG. 10.

In the modification, set loads of springs 48 - - - for biasing pistons 49 - - - slidably received in cylinders 9₂ - - - are adjusted by urging forces of output rods 51 - - - of linear solenoids 50 - - -, respectively.

Therefore, during a normal traveling, the output rods 51 - - - of the linear solenoids 50 - - - can be advanced by a command from an electronic control unit 34 to urge the piston 49 - - - strongly against the lower surface of a movable plate rubber leaf spring 11, thereby increasing the rigidity of the movable plate rubber leaf spring 11 to provide the characteristic ① shown in FIG. 6. On the other hand, during idling or during a low speed traveling, the output rods 51 - - - of the linear solenoids 50 - - - are retreated to urge the pistons 49 - - - weakly against the lower surface of the movable plate rubber leaf spring 11, thereby decreasing the rigidity of the movable plate rubber leaf spring 11 to provide the characteristic ③ shown in FIG. 6.

Figure 11:
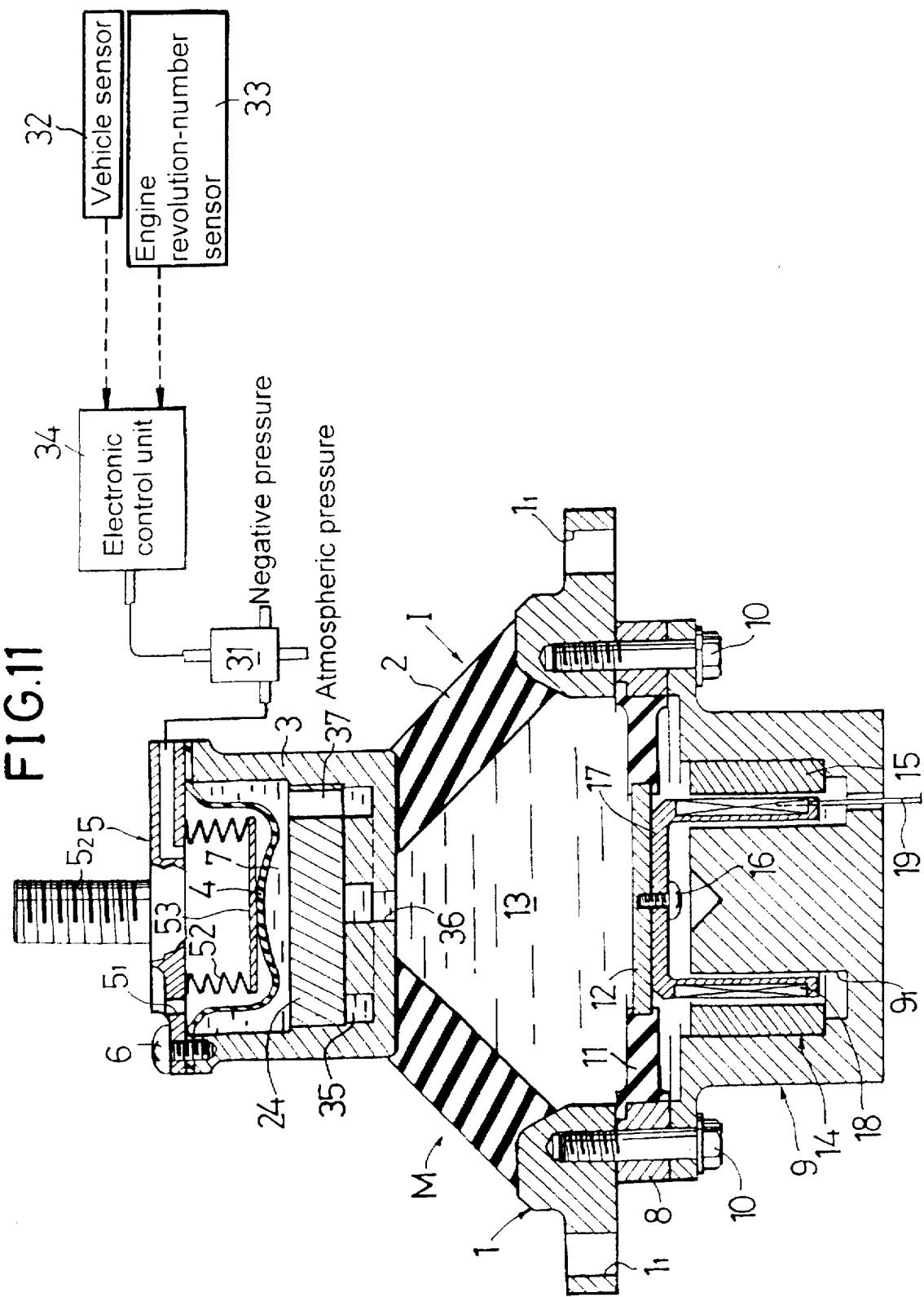
FIG. 11 is a sectional view similar to FIG. 1 of the first embodiment, but illustrating a fourth embodiment of the present invention.

A fourth embodiment of the present invention will be described in connection with FIG. 11.

In a vibration-isolating mount device M of the fourth embodiment, an urging plate 53 is supported on a lower surface of a mounting member 5 through a metal bellows 52, and abuts against an upper surface of a diaphragm 4. An internal space in the metal bellows 52 is selectively put into communication with an intake manifold or the atmosphere through a solenoid valve 31 which is controlled by an electronic control unit 34. The metal bellows 52 is biased in its expanding direction, i.e., in a direction of abutment of the urging plate 53 against the upper surface of the diaphragm 4 by a resilient force of the metal bellows 52 itself.

Thus, during a normal traveling, the inside of the metal bellows 52 is opened to the atmosphere through the solenoid valve 31 to permit the urging plate 53 to be urged strongly against the upper surface of the diaphragm 4, thereby increasing the rigidity of the diaphragm 4 to provide the characteristic ① shown in FIG. 6. On the other hand, during idling or during a low speed traveling, the inside of the metal bellows 52 is put into communication with the intake manifold through the solenoid valve 31 to permit the metal bellows 52 to be contracted away from the upper surface of the diaphragm 4 by a negative pressure, thereby decreasing the rigidity of the diaphragm 4 to provide the characteristic ③ shown in FIG. 6.

Figure 12:
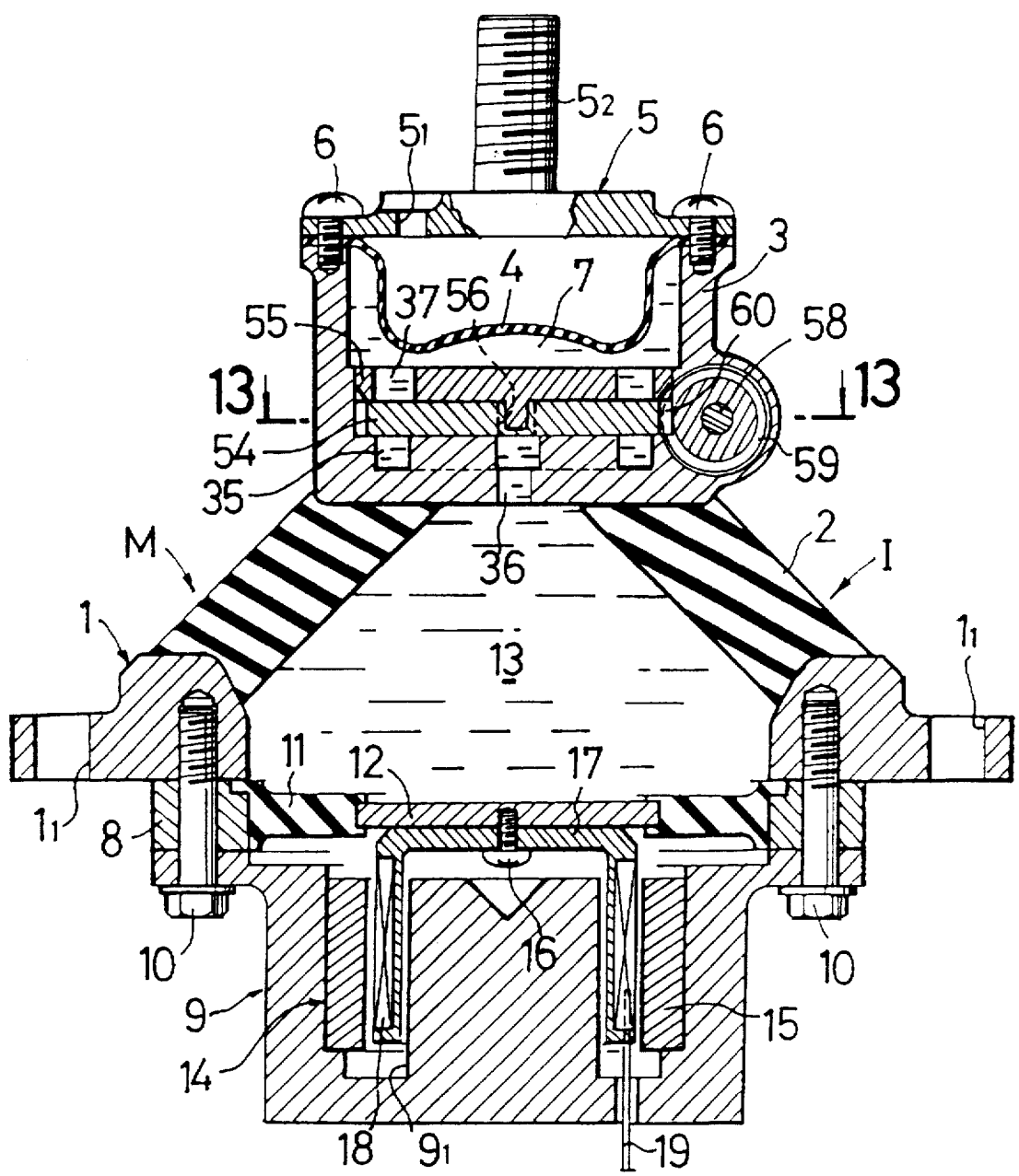
FIGS. 12 and 13 illustrate a fifth embodiment of the present invention, FIG. 12 being a sectional view similar to FIG. 1 of the first embodiment, and FIG. 13 being a sectional view taken along a line 13—13 in FIG. 12.
Figure 13:
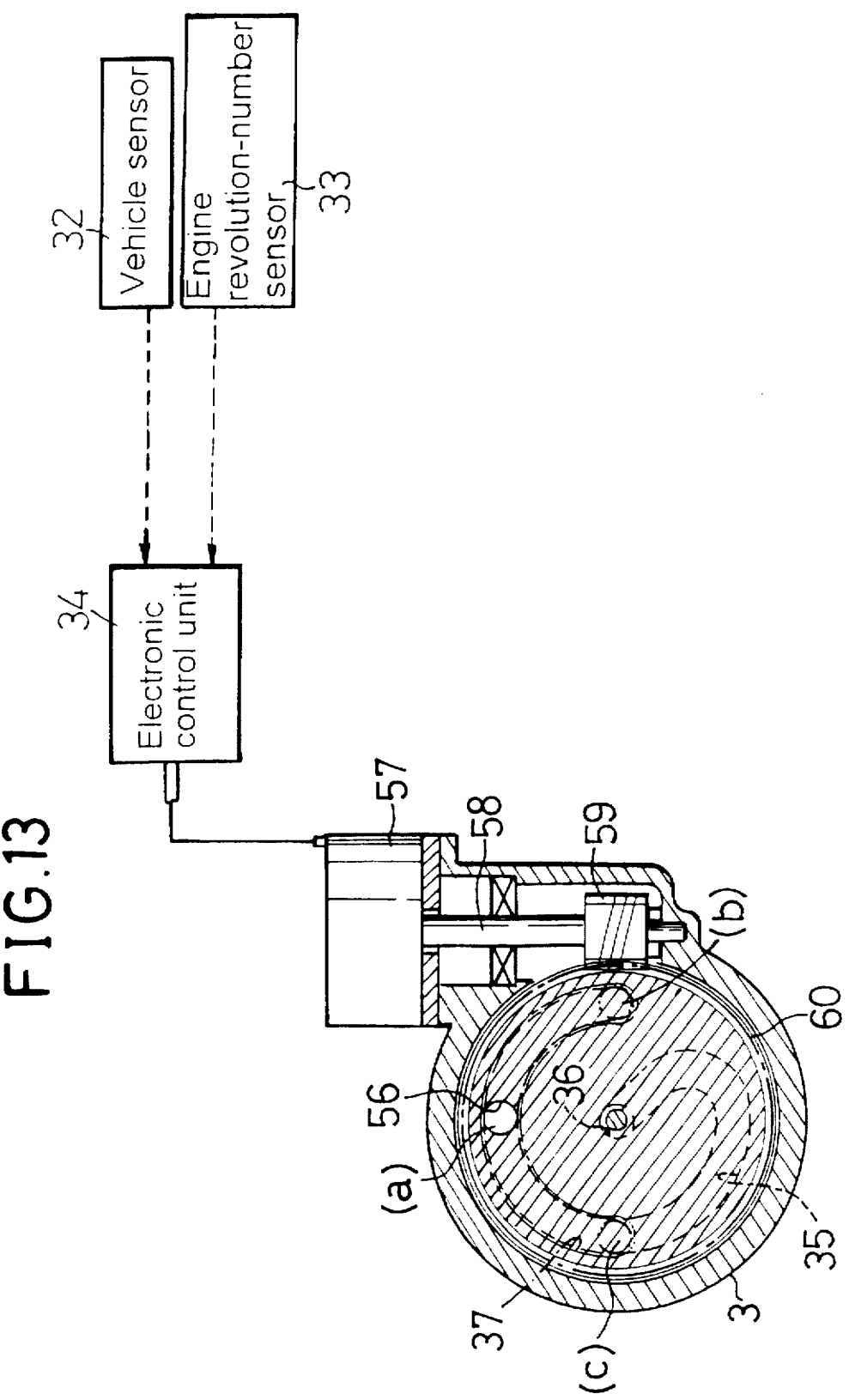

A fifth embodiment of the present invention will be described below in connection with FIGS. 12 and 13.

In a vibration-isolating device M of the fifth embodiment, a lower passage defining member 54 and an upper passage defining member 55 are accommodated in a superposed manner within a subsidiary fluid chamber housing 3 on its internal bottom surface. A substantially 6-shaped fluid passage 35 is defined in the internal bottom surface of the subsidiary fluid chamber housing 3 to communicate with a primary fluid chamber 13 through a first through-hole 36. A second semi-circular through-hole 37 is defined in the upper passage defining member 55 fixed to the subsidiary fluid chamber housing 3 to communicate with a subsidiary fluid chamber 7. The second semi-circular through-hole 37 overlaps the fluid passage 35, as shown in FIG. 13. A third through-hole 56 permitting the communication between the fluid passage 35 and the second through-hole 37 is defined in the lower passage defining member 54 which is rotatably clamped between the subsidiary fluid chamber housing 3 and the upper passage defining member 55.

A step motor 57 is supported on the subsidiary fluid chamber housing 3. A worm 59 is secured to an output shaft 58 of the step motor 57 and meshed with a worm wheel 60 which is formed around an outer periphery of the lower passage defining member 54. Therefore, the step motor 57 is driven by a command from an electronic control unit 34, thereby rotating the lower passage defining member 54 to shift the position of the third through-hole 56 among a position assumed during a normal traveling and indicated by a character (a) in FIG. 13, a position assumed during idling or during a low speed traveling and indicated by a character (b), and a position assumed upon failure and indicated by a character (c).

Thus, when the third through-hole 56 is in the position (a) assumed during the normal. traveling, the passage length amounts to a medium value to provide the characteristic ① shown in FIG. 6, thereby ensuring that a large damping force can be generated by a sudden increase in difference in phase between the input and the displacement in a shake vibration region of 8 Hz to 15 Hz to effectively inhibit the shake phenomenon. When the third through-hole 56 is in the position (b) assumed during the idling or during the low speed traveling, the passage length amounts to the largest value to provide the characteristic ② shown in FIG. 6, thereby ensuring that the region in which the difference in phase between the input and the displacement is suddenly varied can be shifted toward a frequency lower than the shake vibration region to effectively exhibit a damping effect by the movable plate 12 over a wide frequency region. In this manner, by varying the length of the fluid passage 35 as in the first embodiment, the characteristic provided during the normal traveling and the characteristic provided during the idling or during the low speed traveling can be changed over from one to another.

Now, assume that the voice coil motor 14 is failed to cause the movable plate 12 to be stuck, or to be brought into a non-controlled state during idling or during a low speed traveling. In such a condition in which vibration-inhibiting effect by the voice coil motor 14 can not be obtained, a problem is encountered that the dynamic spring constant of the vibration-isolating mount device M becomes too large, which makes worse the transmitting property of the vibration to the vehicle body, because the difference in phase between the input and the displacement is suddenly increased with an input frequency in a higher frequency region than the shake vibration region, provided that the characteristic ① shown in FIG. 6 has been selected.

Thereupon, when the voice coil motor 14 is failed to cause the movable plate 12 to be stuck during the idling or during the low speed traveling, a characteristic ④ shown in FIG. 6 is selected by moving the third through-hole 56 to the position (c) assumed upon failure to provide the shortest length of the fluid passage 35. When the voice coil motor 14 is failed to cause the movable plate 12 to be brought into the non-controlled state during the idling or during the low speed traveling, a characteristic ⑤ shown in FIG. 6 is selected likewise by moving the third through-hole 56 to the position (c) assumed upon failure to provide the shortest length of the fluid passage 35. Even when any of the characteristics ④ and ⑤ is selected, the spring constant is suppressed to a lower level in an input frequency region during the idling or during the low speed traveling, i.e., the vibration-isolating mount device M is softened and hence, it is possible to prevent the vibration of the engine from being transmitted to the vehicle body to avoid the degradation of the riding comfort.

When the voice coil motor 14 is failed during a normal traveling, the position of the third through-hole 56 is maintained at the position (a) assumed during the normal traveling, and the characteristic ① shown in FIG. 6 is selected. As a result, the characteristic of the vibration-isolating mount device M becomes the same as that of a vibration-isolating mount device of a type having no movable plate 12, and an effect of inhibiting a shake phenomenon is maintained as before the failure.

Figure 14:
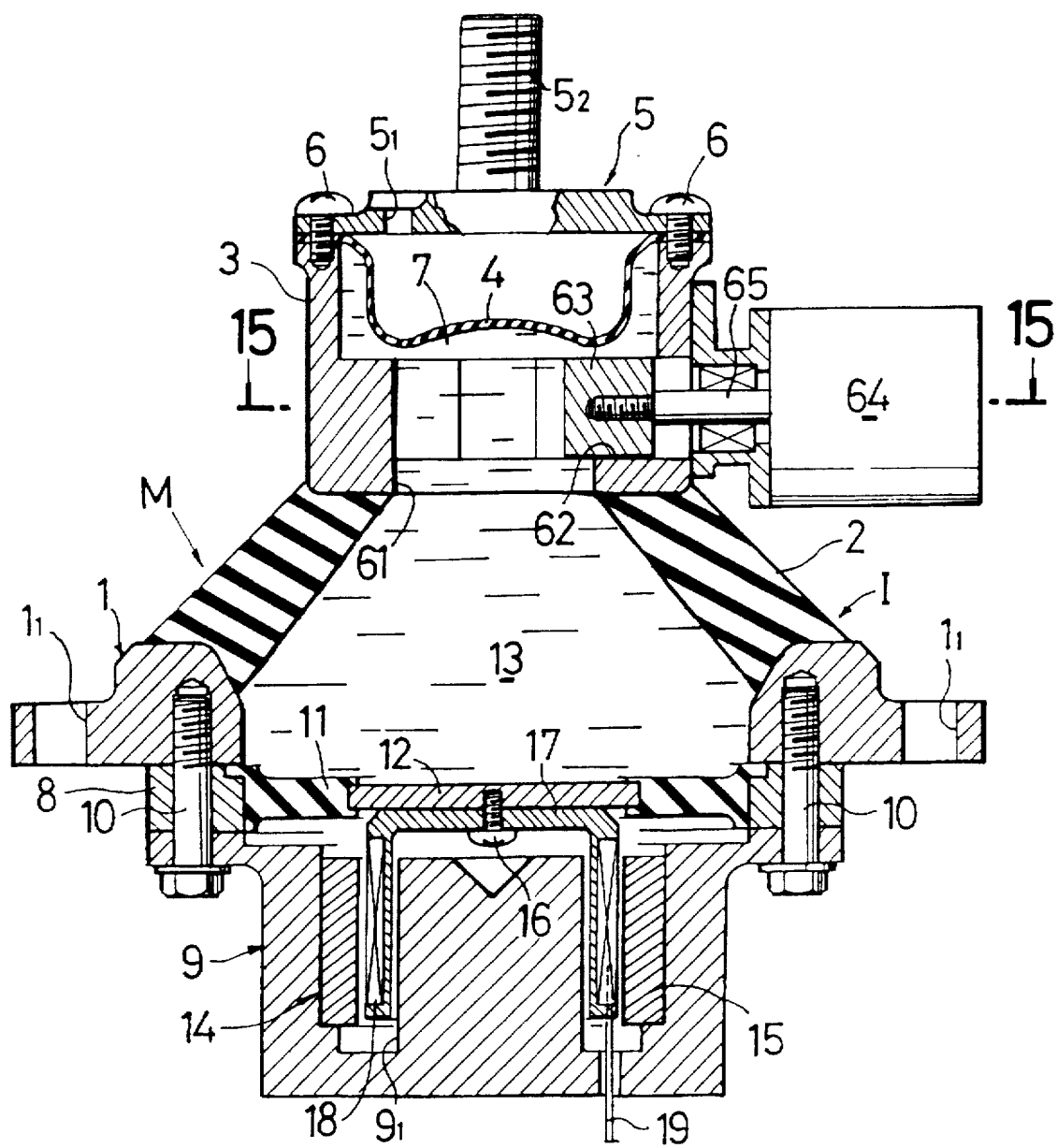
FIGS. 14 and 15 illustrate a sixth embodiment of the present invention, FIG. 14 being a sectional view similar to FIG. 1 of the first embodiment, and FIG. 15 being a sectional view taken along a line 15—15 in FIG. 14.
Figure 15:
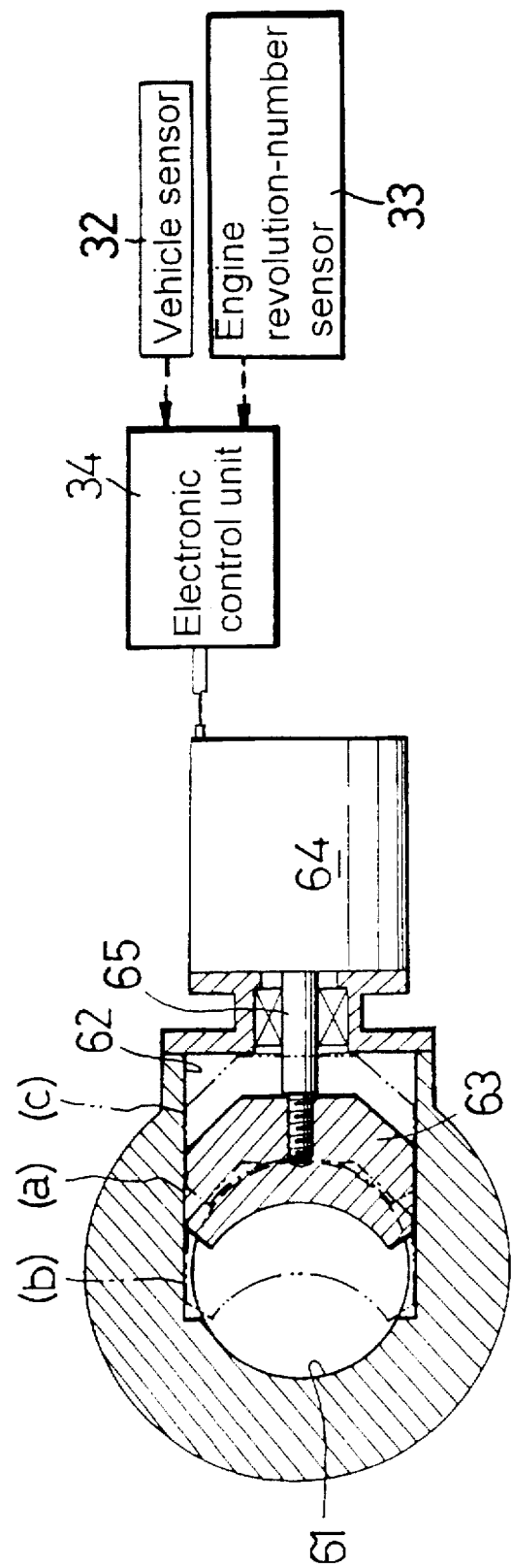

A sixth embodiment of the present invention will be described below in connection with FIGS. 14 and 15.

In a vibration-isolating mount device M of the sixth embodiment, a fluid passage 61 having a relatively large diameter is defined in a bottom wall of a subsidiary fluid chamber housing 3, and a shutter 63 is slidably fitted in a guide groove 62 connected to an upper surface of the fluid passage 61. The shutter 63 is connected to and driven by an output rod 65 of a linear solenoid 64 supported on the subsidiary fluid chamber housing 3.

By driving the linear solenoid 64 with a command from an electronic control unit 34, the shutter 63 is moved into a position (a) during a normal traveling to limit a sectional area of the fluid passage 61 to a medium value, or the shutter 63 is moved into a position (b) during idling or during a low speed traveling to limit the sectional area of the fluid passage 61 to smallest value, or the shutter 63 is moved into a position (c) upon failure during the idling or during the low speed traveling to maximize the sectional area of the fluid passage 61.

This makes it possible to provide the characteristic ① during the normal traveling to effectively inhibit the shake phenomenon, or to provide the characteristic ③ during the idling or during the low speed traveling to exhibit a damping effect by the movable plate 12 in a low frequency region. Further, when a failure causing the sticking of the movable plate 12 is produced during the idling or during the low speed traveling, the characteristic ④ is provided. When a failure is produced during the idling or during the low speed traveling to cause the movable plate 12 to be brought into a non-controlled state, the characteristic ⑤ is provided. Thus, the spring constant can be suppressed to a lower level in a low frequency region to avoid the degradation of the riding comfort performance.

When the voice coil motor 14 is failed during the normal traveling, the position of the shutter 63 is maintained at the position (a) assumed during the normal traveling, and the characteristic ① shown in FIG. 6 is selected. As a result, the characteristic of the vibration-isolating mount device M is the same as a vibration-isolating mount device having no movable plate 12, and an effect of inhibiting the shake phenomenon is maintained as before the failure.

Figure 16:
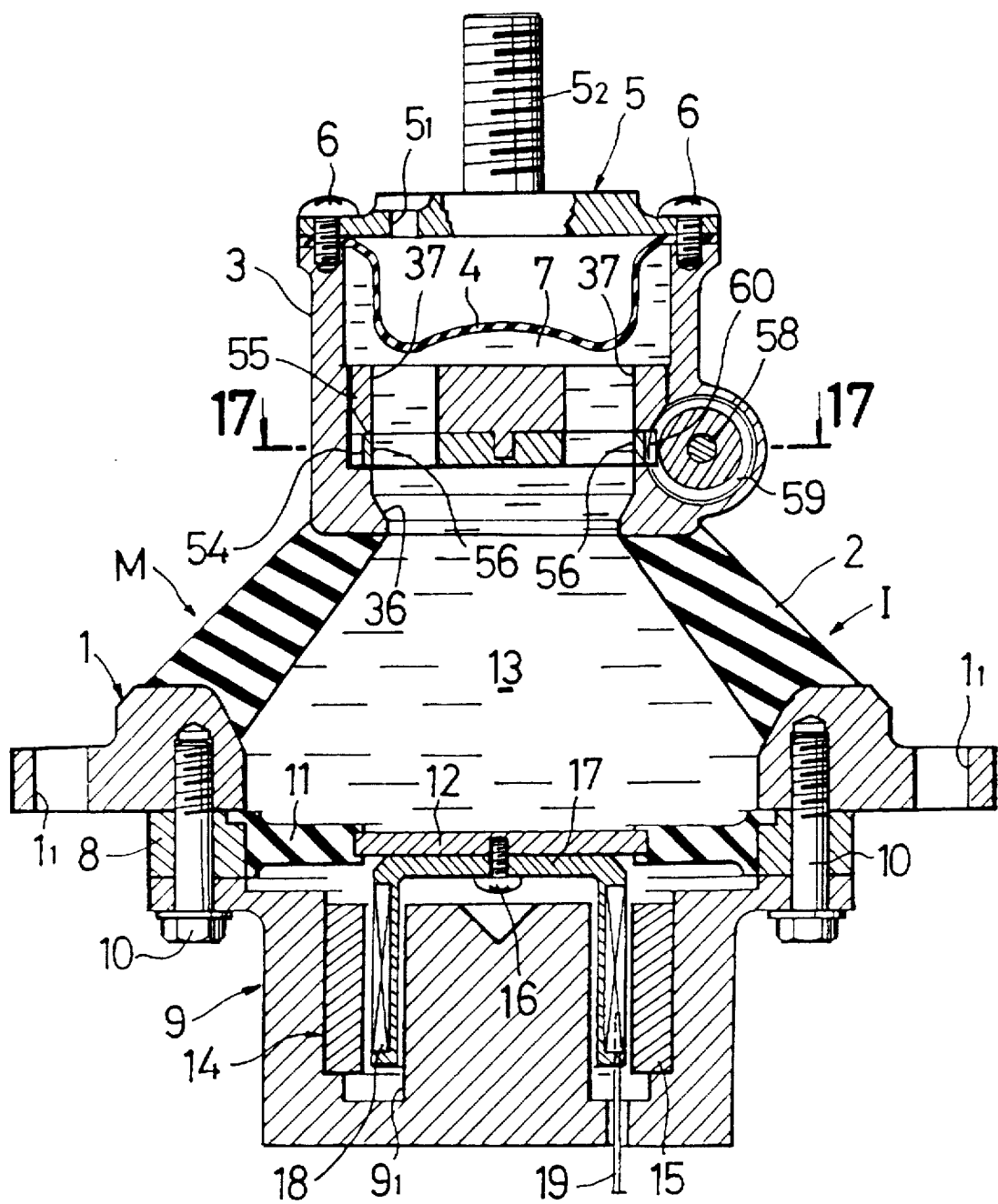
FIGS. 16 and 17 illustrate a seventh embodiment of the present invention, FIG. 16 being a sectional view similar to FIG. 1 of the first embodiment, and FIG. 17 being a sectional view taken along a line 17—17 in FIG. 16.
Figure 17:
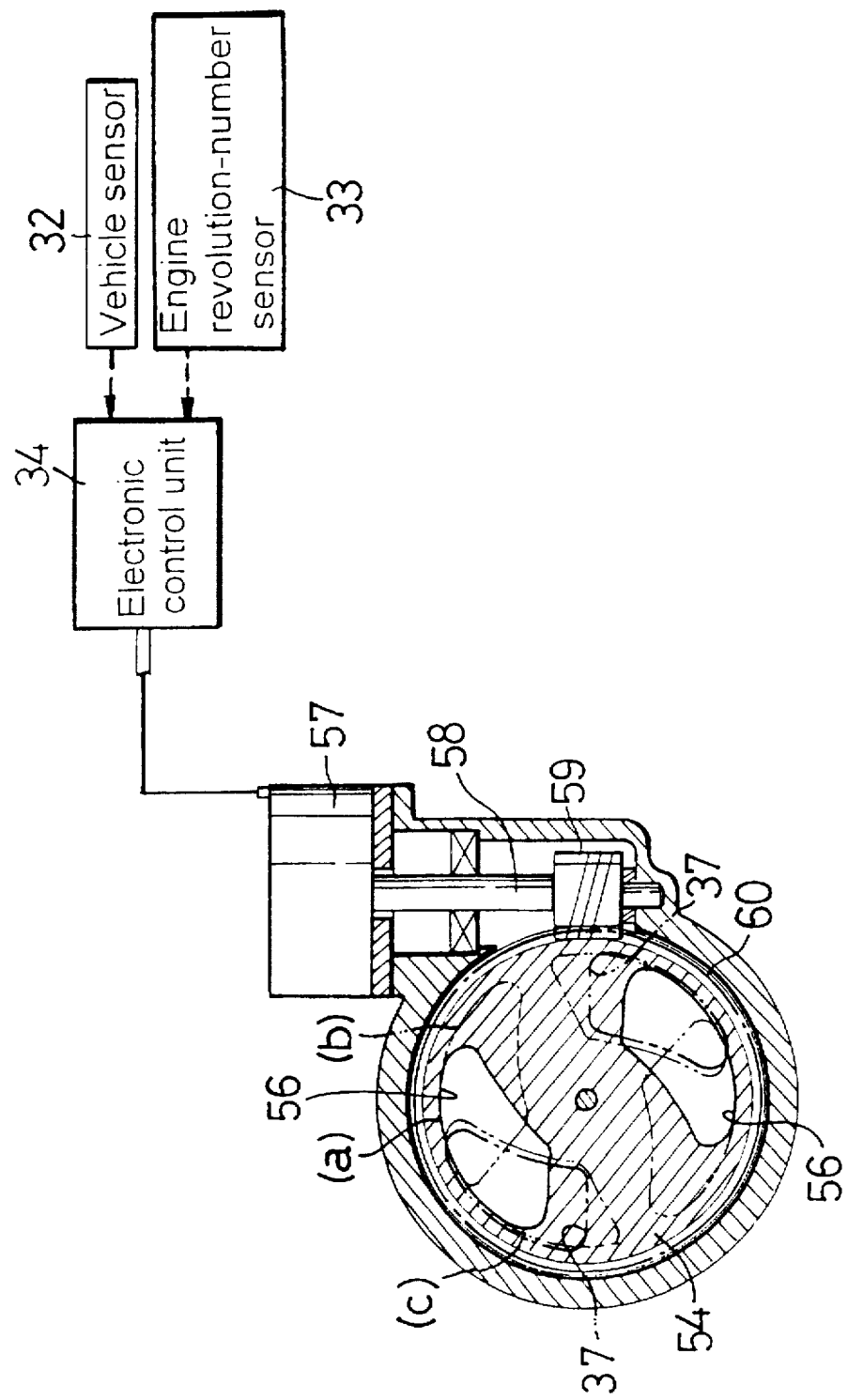

A seventh embodiment of the present invention will be described in connection with FIGS. 16 and 17.

A vibration-isolating mount device M of the seventh embodiment has a first through-hole 36 of a relatively large diameter in a bottom wall of a subsidiary fluid chamber housing 3, and a pair of second through-holes 37, 37 in an upper passage defining member 55. A lower passage defining member 54 is clamped between the internal bottom wall of the subsidiary fluid chamber housing 3 and the upper passage defining member 55 and driven for rotation through a worm 59 and a worm wheel 60 by a step motor 57. The lower passage defining member 54 has a pair of third through-holes 56, 56 having the same shape as the pair of the second through-holes 37, 37 in the upper passage defining member 55.

Thus, if the lower passage defining member 54 is rotated during a normal traveling to bring the third through-holes 56, 56 into a state (a), the sectional area of the fluid passage is limited to a medium value, thereby providing the characteristic ① shown in FIG. 6. If the third through-holes 56, 56 are brought into a state (b) during idling or during a low speed traveling, the sectional area of the fluid passage is limited to the smallest value, thereby providing the characteristic ③ shown in FIG. 6. Further, when a failure causing the sticking of the movable plate 12 is produced during the idling or during the low speed traveling or when the failure is produced to cause the movable plate 12 to be brought into the non-controlled state, the sectional area of the fluid passage is controlled to the largest value, thereby providing the characteristic ④ or ⑤ shown in FIG. 6. Thus, it is possible to exhibit an operational effect similar to that in the sixth embodiment.

Figure 18:
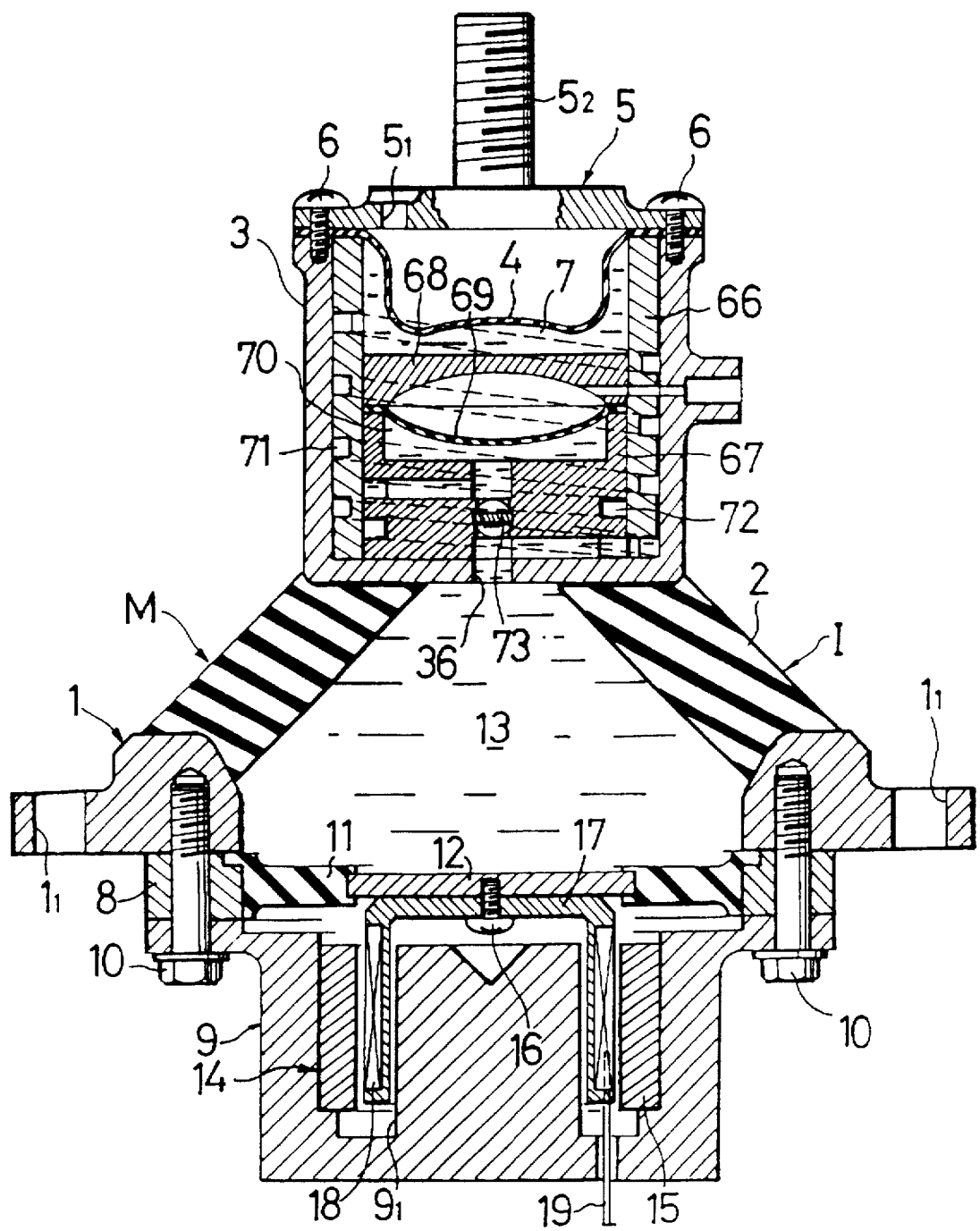
FIGS. 18 and 19 illustrate an eighth embodiment of the present invention, FIG. 18 being a sectional view similar to FIG. 1 of the first embodiment, and FIG. 19 being an enlarged view of an essential portion shown in FIG. 18.
Figure 19:
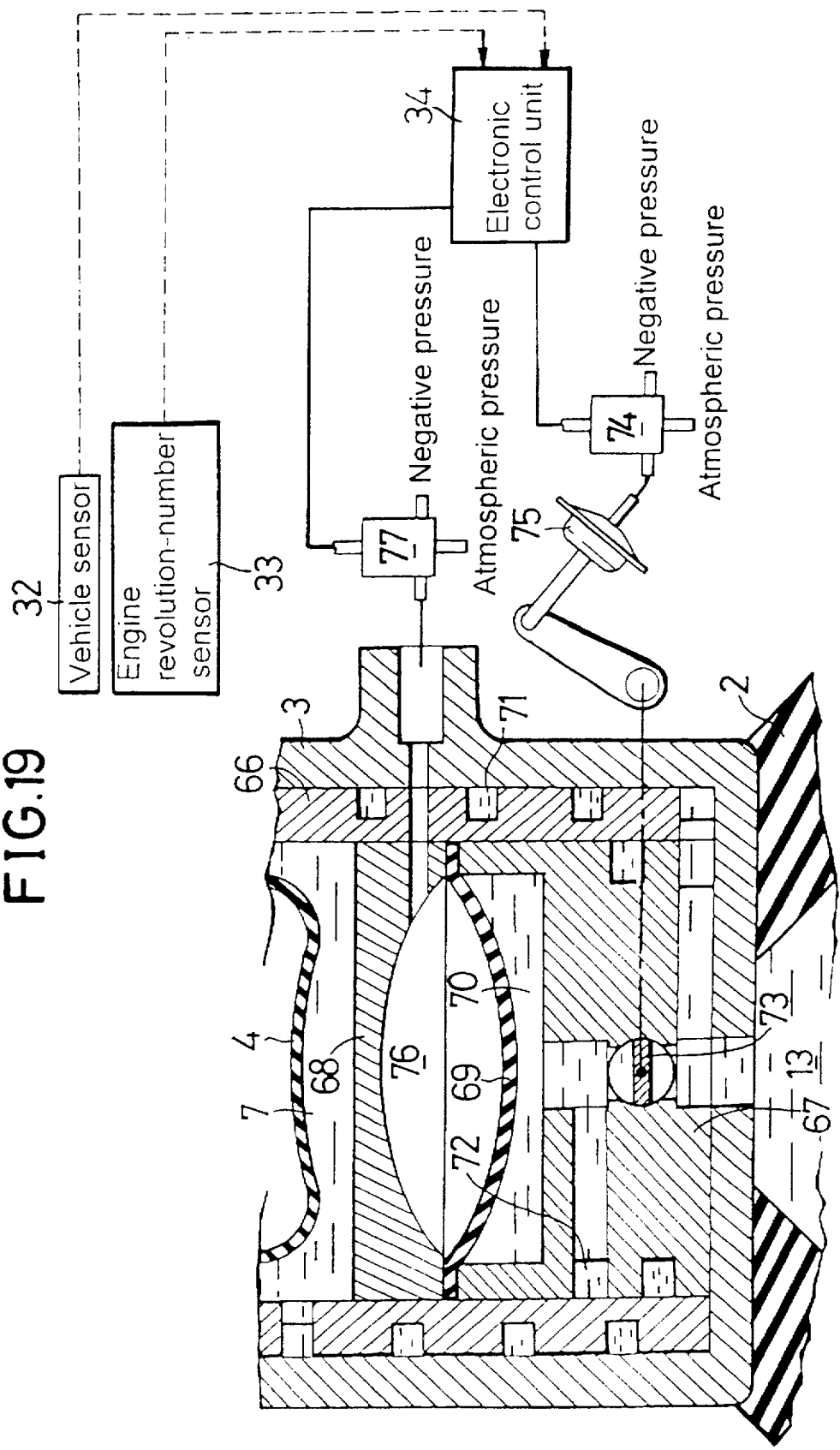

An eighth embodiment of the present invention will be described in connection with FIGS. 18 and 19.

A vibration-isolating mount device M of the eighth embodiment includes a first passage defining member 66 fitted to an inner periphery of a subsidiary fluid chamber housing 3, a second passage defining member 67 and a third passage defining member 68 superposed one on another within the first passage defining member 66. A diaphragm 69 is stretched between the second passage defining member 67 and the third passage defining member 68, and a second subsidiary fluid chamber 70 is defined between the second passage defining member 67 and the diaphragm 69.

A first subsidiary fluid chamber 7 (which corresponds to the subsidiary fluid chamber 7 in each of the first to seventh embodiments) is defined above the third passage defining member 68 and connected to a primary fluid chamber 13 through a first fluid passage 71 of a long length defined helical between an outer periphery of the first passage defining member 66 and an inner periphery of the subsidiary fluid chamber housing 3. The second subsidiary fluid chamber 70 is also connected to the primary fluid chamber 13 through a second fluid passage 72 of a short length defined helical between an inner periphery of the first passage defining member 66 and an outer periphery of the second passage defining member 67.

A switch-over valve 73 is provided between the primary fluid chamber 13 and the second subsidiary fluid chamber 70. If the switch-over valve 73 is opened, the primary fluid chamber 13 and the second subsidiary fluid chamber 70 are put into direct communication with each other through an extremely short passage. The switch-over valve 73 is opened and closed by an actuator 75 connected to a solenoid valve 74. A control chamber 76 is defined between the diaphragm 69 and the third passage defining member 68 and selectively put into communication with either one of an intake manifold of an engine and the atmosphere through a solenoid valve 77. If the control chamber 76 is put into communication with the intake manifold, the diaphragm 69 is brought into close contact with an upper wall of the third passage defining member 68 to fix the volume of the second subsidiary fluid chamber 70, whereby the second subsidiary fluid chamber 70 would not function.

Thus, by bringing the switch-over valve 73 into a closed position shown and at the same time, by opening the control chamber 76 to the atmosphere during a normal traveling, the primary fluid chamber 13 is connected to the first fluid chamber 7 through the long first fluid passage 71 and is also connected to the second subsidiary fluid chamber 70 through the short second fluid passage 72. At this time, the first fluid passage 71 having the long length is brought into a closed state and hence, the primary fluid chamber 13 is substantially put into communication with the second subsidiary fluid chamber 70 through the second fluid passage 72 having the short length, thereby providing the characteristic ① shown in FIG. 6.

During idling or during a low speed traveling, the control chamber 76 is brought, from a state provided during the normal traveling, into communication with the intake manifold to fix the diaphragm into non-deformable state, thereby stopping the function of the second subsidiary fluid chamber 70. As a result, the primary fluid chamber 13 can be substantially put into communication with the first subsidiary fluid chamber 7 through the first fluid passage 71 having the long length, thereby providing the characteristic ② shown in FIG. 6.

Further, when the voice coil motor 14 is failed during idling or during a low speed traveling, the switch-over valve 73 is opened from its state provided during the normal traveling to directly connect the primary fluid chamber 13 and the second subsidiary fluid chamber 70 to each other through an extremely short passage, thereby bringing the first fluid passage 71 and the second fluid passage 72 into their closed states. Thus, when a failure causing the movable plate 12 to be stuck is produced, the characteristic ④ shown in FIG. 6 can be provided, and when a failure causing the movable plate 12 to be brought into a non-controlled state is produced, the characteristic ⑤ shown in FIG. 6 can be provided.

Although the embodiments of the present invention have been described in detail, it will be understood that the present invention is not limited to these embodiments, and various modifications in design can be made without departing from the spirit and scope of the invention defined in claims.

Figure 20:
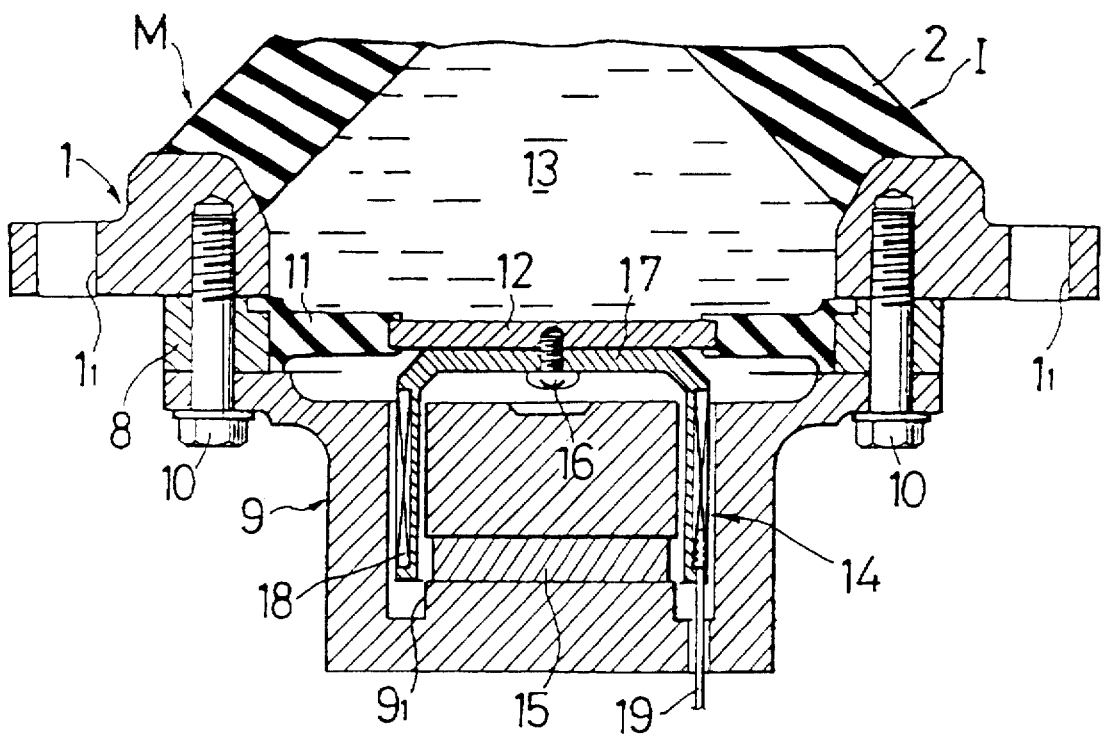
FIG. 20 is a view of a modification to a voice coil motor.

For example, as shown in FIG. 20, the permanent magnet 15 of the voice coil motor 14 can be disposed inside the coil 18. In addition, the vibration-isolating mount device according to the present invention is applicable to the supporting of any vibration source other than an engine mount.

What is claimed is:

1. A vibration-isolating mount device for isolating an engine from a vehicle frame, comprising:

a first mounting member fixable to the engine;

a second mounting member fixable to the vehicle frame;

an intermediate member interconnecting the first and second mounting members;

said intermediate member having an outer shell formed, at least in part, of an elastomer, and having a primary fluid chamber with a fluid sealedly charged therein and a subsidiary fluid chamber;

a movable plate connected to actuator means and forming a portion of said primary fluid chamber;

damping characteristic varying means for varying the damping characteristic of said intermediate member, including a first fluid passage, and a second fluid passage, extending between said primary fluid chamber and said subsidiary fluid chamber, said first fluid passage being shorter than said second fluid passage;

the first fluid passage of the damping characteristic varying means having a liquid column resonance characteristic providing a substantial difference in phase between an input and a displacement in a shake vibration frequency region, to damp vibration;

the second fluid passage being longer than the first fluid passage and having a liquid column resonance characteristic providing a substantial difference in phase between an input and a displacement in a frequency region lower than said shake vibration frequency region thereby keeping the spring constant of the mount device at a substantially high, stabilized level;

means for selecting said first fluid passage and closing off said second fluid passage, during normal travel of the vehicle, and for selecting said second fluid passage and closing off said first fluid passage, during low speed travelling of the vehicle or when the engine is idling means for moving the movable plate independently of selection of the first or second fluid passages and operated by said actuator means to control a variation in fluid pressure within said primary fluid chamber, for controlling expansion and compression of said vibration-isolating mount device to damp vibration transmitted from the engine toward the vehicle frame.

2. A vibration-isolating mount device according to claim 1 wherein the length of each of said fluid passages is variable.

3. A vibration-isolating mount device for isolating an engine from a vehicle frame, comprising:

a first mounting member fixable to the engine;

a second mounting member fixable to the vehicle frame;

an intermediate member interconnecting the first and second mounting members;

said intermediate member having an outer shell formed, at least in part, of an elastomer, and having a first fluid chamber and a second fluid chamber, each with a fluid sealedly charged therein;

a movable plate connected to a vibration motor and forming a portion of said second fluid chamber;

said movable plate being movable so as to cause a variation in fluid pressure in said second fluid chamber so as to damp a vibration transmitted from the engine toward the vehicle frame;

said first fluid chamber communicating with said second fluid chamber through first and second fluid passages;

damping characteristic varying means for varying dampening of the intermediate member by selecting one of said first and second fluid passages;

the first fluid passage of the damping characteristic varying means having a liquid column resonance characteristic providing a substantial difference in phase between an input and a displacement in a shake vibration frequency region, to damp vibration;

the second fluid passage being longer than the first fluid passage and having a liquid column resonance characteristic providing a substantial difference in phase between an input and a displacement in a frequency lower than said shake vibration frequency region thereby keeping the spring constant of the mount device at a substantially high, stabilized level;

the first fluid passage used during normal travel whereby shake vibration is damped by the first fluid passage and vibration other than shake vibration is damped with a controlled variation in fluid pressure within the second fluid chamber, and with the second fluid passage used during low speed travelling or idling, whereby all vibrations are damped with a controlled variation in fluid pressure within the second fluid chamber.

4. The vibration-isolating mount device according to claim 3, wherein each of said fluid passages have different shapes.

5. The vibration-isolating mount device according to claims 3, wherein each of said fluid passages have different lengths.

6. The vibration-isolating mount device according to claim 3, wherein one of said fluid passages is selected to shift the damping characteristic of the device toward a lower frequency side.

7. The device of claim 3 further comprising a flexible leaf spring attached around the perimeter of the movable plate and supported by the second mounting member.

8. A vibration isolating device for isolating an engine from a vehicle frame, comprising:

an engine mounting plate attachable to the engine;

a frame mounting member attachable to the vehicle frame;

an intermediate member interconnecting the engine mounting plate and the frame mounting member;

said intermediate member having an outer shell made, at least in part, of an elastomer, and forming a primary fluid chamber containing a fluid;

a subsidiary fluid chamber housing attached to the outer shell and forming a subsidiary fluid chamber;

a diaphragm within the subsidiary fluid chamber housing and the engine mounting plate;

a passage defining member in the subsidiary fluid chamber housing, between said primary and said subsidiary fluid chambers, said passage defining member defining a first fluid passage, and a second fluid passage, with the second fluid passage longer than the first fluid passage;

a switch over valve for selecting the first or second passage;

a voice coil motor supported by the engine mounting plate;

a vibration plate attached to the voice coil motor;

a flexible plate leaf spring surrounding the vibration plate and attached to the frame mounting member, with said vibration plate and plate leaf spring forming a lower wall of said primary fluid chambers;

an electronic controller linked to the voice coil motor and to the switch over valve, the electronic controller switching the switch over valve to open the first fluid passage between the primary and the subsidiary fluid chambers, during normal vehicle travel, to dampen any shake vibration occurring via fluid flowing through the first fluid passage, and the controller controlling the voice coil motor to dampen other non-shake vibrations, and the electronic controller switching the switch over valve to open the second fluid passage between the primary and subsidiary fluid chambers, during low speed vehicle travel and engine idling, to dampen vibration by controlling the voice coil motor.

9. The vibration isolating device of claim 8 further comprising a vent hole in the engine mounting plate, venting to ambient the space between the diaphragm and the engine mounting plate.

10. A vibration isolator, comprising:

an engine mounting plate;

a fluid chamber housing attached to the engine mounting plate;

a diaphragm within the fluid chamber housing forming a first fluid chamber therein;

an elastomeric block attached to the fluid chamber housing;

a vehicle frame mounting member attached to the elastomeric block;

a movable plate attached to the mounting member through an elastomeric spring, with the elastomeric block, the mounting member, the elastomeric spring, the movable plate and a lower surface of the fluid chamber housing forming a second fluid chamber;

a voice coil motor attached to the movable plate;

a passage member in the fluid chamber housing, the passage member having a first and a second passage each extending between the first and second fluid chambers, with the first passage longer than the second passage;

a switch over valve in the fluid chamber housing for selecting one of the first and second passage;

means for selecting the second passage when engine rpm exceeds 1,200 rpm or the vehicle speed exceeds 40 km/hr, and for selecting the first passage when engine rpm is equal to or less than 1,200 rpm or the vehicle speed is equal to or less than 40 km/hr.

11. The isolator of claim 10 herein selection of the second passage provides a maximum phase difference between input and output vibrations through the isolator at a frequency between 8–15 Hz, and wherein selection of the first fluid passage provides a maximum phase difference at a frequency below 8 Hz.

* * * * *